United States Patent
Li

(10) Patent No.: US 10,937,184 B2
(45) Date of Patent: Mar. 2, 2021

(54) CAMERA ASSEMBLY, METHOD FOR TRACKING TARGET PORTION BASED ON THE SAME, AND ELECTRONIC DEVICE

(71) Applicant: GUANGDONG OPPO MOBILE TELECOMMUNICATIONS CORP., LTD., Dongguan (CN)

(72) Inventor: Xiaopeng Li, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 91 days.

(21) Appl. No.: 15/623,182

(22) Filed: Jun. 14, 2017

(65) Prior Publication Data

US 2018/0150968 A1    May 31, 2018

(30) Foreign Application Priority Data

Nov. 29, 2016    (CN) .......................... 201611092361.9

(51) Int. Cl.
*H04N 5/265*    (2006.01)
*G06T 7/70*    (2017.01)
(Continued)

(52) U.S. Cl.
CPC .............. *G06T 7/70* (2017.01); *G03B 13/36* (2013.01); *G03B 15/00* (2013.01); *G03B 17/561* (2013.01);
(Continued)

(58) Field of Classification Search
CPC .. H04N 5/2251; H04N 5/2258; H04N 5/2259; H04N 5/23212; H04N 5/23219;
(Continued)

(56) References Cited

U.S. PATENT DOCUMENTS 7,414,231 B2    8/2008    Fukui
8,497,536 B2 *  7/2013    Chen ................. H01L 27/14605
                                                        257/228
(Continued)

FOREIGN PATENT DOCUMENTS

CN    102957917 A    3/2013
CN    103155537 A    6/2013
(Continued)

OTHER PUBLICATIONS

European Patent Application No. 17176605.8 extended Search and Opinion dated Jan. 29, 2018, 6 pages.
(Continued)

*Primary Examiner* — Patrick E Demosky
(74) *Attorney, Agent, or Firm* — Lathrop GPM LLP

(57) ABSTRACT

A camera assembly, a method for tracking a target portion based on the camera assembly, and an electronic device are provided. The camera assembly includes: a first camera; a first motor for driving the first camera to move; a second camera, comprising a plurality of pixel blocks each being formed of a plurality of photosensitive pixels and configured to obtain a first photodiode pixel by capturing a target portion of an object to be photographed through a first part of the plurality of photosensitive pixels and obtain a second photodiode pixel by capturing the target portion through a second part of the plurality of photosensitive pixels when the target portion is detected; a controller, configured to obtain a global photodiode pixel, calculate a phase difference and control the first motor to drive the first camera to move to an in-focus position according to the phase difference.

16 Claims, 2 Drawing Sheets

(51) Int. Cl.

| | |
|---|---|
| *G03B 13/36* | (2021.01) |
| *H04N 5/225* | (2006.01) |
| *H04N 5/232* | (2006.01) |
| *G03B 29/00* | (2021.01) |
| *G03B 17/56* | (2021.01) |
| *G03B 15/00* | (2021.01) |
| *H04N 5/369* | (2011.01) |
| *H04N 7/18* | (2006.01) |

(52) U.S. Cl.
CPC .......... *G03B 29/00* (2013.01); *H04N 5/2251* (2013.01); *H04N 5/2258* (2013.01); *H04N 5/2259* (2013.01); *H04N 5/23212* (2013.01); *H04N 5/23218* (2018.08); *H04N 5/23219* (2013.01); *H04N 5/232122* (2018.08); *H04N 5/36961* (2018.08); *H04N 7/181* (2013.01)

(58) Field of Classification Search
CPC .............. H04N 7/181; H04N 5/23216; H04N 5/23222; H04N 5/265; H04N 5/2252; H04N 5/2253; H04N 5/2254; H04N 5/2257; H04N 5/2356; G03B 13/36; G03B 15/00; G03B 17/561; G03B 29/00
See application file for complete search history.

(56) References Cited

U.S. PATENT DOCUMENTS

| | | | | |
|---|---|---|---|---|
| 2002/0050518 | A1* | 5/2002 | Roustaei | G06K 7/10544 235/454 |
| 2003/0164441 | A1* | 9/2003 | Lyon | H04N 3/1562 250/208.1 |
| 2009/0115882 | A1 | 5/2009 | Kawarada | |
| 2010/0073527 | A1 | 3/2010 | Ichimiya | |
| 2011/0199506 | A1 | 8/2011 | Takamiya | |
| 2011/0317042 | A1 | 12/2011 | Goto | |
| 2014/0176780 | A1 | 6/2014 | Koshiba | |
| 2016/0241776 | A1* | 8/2016 | Kim | H04N 5/23212 |
| 2018/0063411 | A1* | 3/2018 | Rivard | H04N 5/23212 |
| 2018/0150968 | A1* | 5/2018 | Li | G03B 13/36 |

FOREIGN PATENT DOCUMENTS

| | | | | |
|---|---|---|---|---|
| CN | 103238097 | A | | 8/2013 |
| CN | 103238098 | A | | 8/2013 |
| CN | 104410783 | A | * | 3/2015 |
| CN | 104410783 | A | | 3/2015 |
| CN | 104730802 | A | | 6/2015 |
| CN | 104806541 | A | | 7/2015 |
| CN | 104835164 | A | | 8/2015 |
| CN | 105141858 | A | | 12/2015 |
| CN | 105530421 | A | | 4/2016 |
| CN | 105590097 | A | | 5/2016 |
| CN | 105611124 | A | | 5/2016 |
| CN | 106506969 | A | | 3/2017 |
| EP | 1845412 | A2 | | 10/2007 |
| EP | 2860961 | A1 | | 4/2015 |
| GB | 2499427 | A | | 8/2013 |
| JP | 2012222471 | A | | 11/2012 |
| JP | 2013003501 | A | | 1/2013 |
| WO | WO-2006098954 | A2 | * | 9/2006 .......... H01L 27/146 |

OTHER PUBLICATIONS

PCT/CN2017/090594 English translation of the International Search Report and Written Opinion dated Sep. 19, 2017, 12 pages.
Chinese Patent Application No. 201611092361.9 English translation of Office Action dated Oct. 31, 2018, 7 pages.
Chinese Patent Application No. 201611092361.9 Office Action dated Oct. 31, 2018, 9 pages.
Chinese Patent Application No. 201611092361.9 Office Action dated Mar. 20, 2019, 8 pages.
Chinese Patent Application No. 201611092361.9 English translation of Office Action dated Mar. 20, 2019, 7 pages.
Indian Patent Application No. 201734027941 Office Action dated Jan. 29, 2020, 6 pages.

* cited by examiner

CAMERA ASSEMBLY, METHOD FOR TRACKING TARGET PORTION BASED ON THE SAME, AND ELECTRONIC DEVICE

CROSS-REFERENCE TO RELATED APPLICATIONS

This application is based on and claims priority of Chinese Patent Application No. 201611092361.9, filed on Nov. 29, 2016.

FIELD

The present disclosure relates to the photographing technology field, and more particularly to a camera assembly, a method for tracking a target portion based on the camera assembly, and an electronic device.

BACKGROUND

With the development of smart terminals (for example, smart phones), people have higher and higher requirements on the photographing function of the smart terminal, especially the portrait tracking function, this is because the portrait is always moving, and the smart terminal can always track the location of the portrait and capture an image of a person only when it has the portrait tracking function. In the related art, dual cameras disposed on the smart terminal (for example, the smart phone) are typically used to realize face tracking.

However, since the PD (photodiode) pixel in the existing dual cameras has a small area, it is only possible to take the face area as a focus area for calculating a phase difference, which may result in that the phase difference is not accurate, such that the face in the image of the person is clear and other parts are unclear, and the purpose of portrait tracking cannot be realized, and thus the user experience is poor.

DISCLOSURE

The present disclosure aims to solve at least one of existing problems in the related art to at least extent.

Accordingly, a first objective of the present disclosure is to provide a camera assembly, which can increase an area of a photodiode pixel, such that sensitivity is enhanced accordingly, thus enhancing the accuracy of target portion tracking, realizing the function of quick focusing, and improving the user experience.

A second objective of the present disclosure is to provide a method for tracking a target portion based on the camera assembly.

A third objective of the present disclosure is to provide an electronic device.

To achieve the above objectives, embodiments of a first aspect of the present disclosure provide a camera assembly. The camera assembly includes: a first camera; a first motor, coupled to the first camera, and configured to drive the first camera to move; a second camera, including a plurality of pixel blocks, each pixel block being formed of a plurality of photosensitive pixels and being configured to obtain a first photodiode pixel by capturing a target portion of an object to be photographed through a first part of the plurality of photosensitive pixels and to obtain a second photodiode pixel by capturing the target portion through a second part of the plurality of photosensitive pixels when the target portion is detected by the second camera; a controller, coupled to the first camera, the first motor and the second camera respectively, and configured to obtain a global photodiode pixel captured by the second camera, to calculate a phase difference according to the global photodiode pixel, and to control the first motor to drive the first camera to move to an in-focus position according to the phase difference.

In order to achieve above objectives, embodiments of a second aspect of the present disclosure provide a method for tracking a target portion based on the camera assembly described in embodiments of the first aspect of the present disclosure. The method includes: when a target portion of an object to be photographed is detected, capturing the target portion by a first part of a plurality of photosensitive pixels to obtain a first photodiode pixel, in which the plurality of photosensitive pixels form one pixel block, and a plurality of pixel blocks form the second camera; capturing the target portion by a second part of the plurality of photosensitive pixels to obtain a second photodiode pixel; obtaining a global photodiode pixel captured by the second camera; calculating a phase difference according to the global photodiode pixel; and controlling the first motor to drive the first camera to move to an in-focus position according to the phase difference.

In order to achieve above objectives, embodiments of a third aspect of the present disclosure provide an electronic device. The electronic device includes the camera assembly described in embodiments of the first aspect of the present disclosure.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings.

EMBODIMENTS OF THE PRESENT DISCLOSURE

Reference will now be made in detail to exemplary embodiments, examples of which are illustrated in the accompanying drawings, in which the same or similar reference numbers throughout the drawings represent the same or similar elements or elements having same or similar functions. Embodiments described below with reference to drawings are merely exemplary and used for explaining the present disclosure, and should not be understood as limitation to the present disclosure.

In the following, a camera assembly, a method for tracking a target portion based on the camera assembly and an electronic device according to embodiments of the present disclosure are described with reference to drawings.

Figure 1:
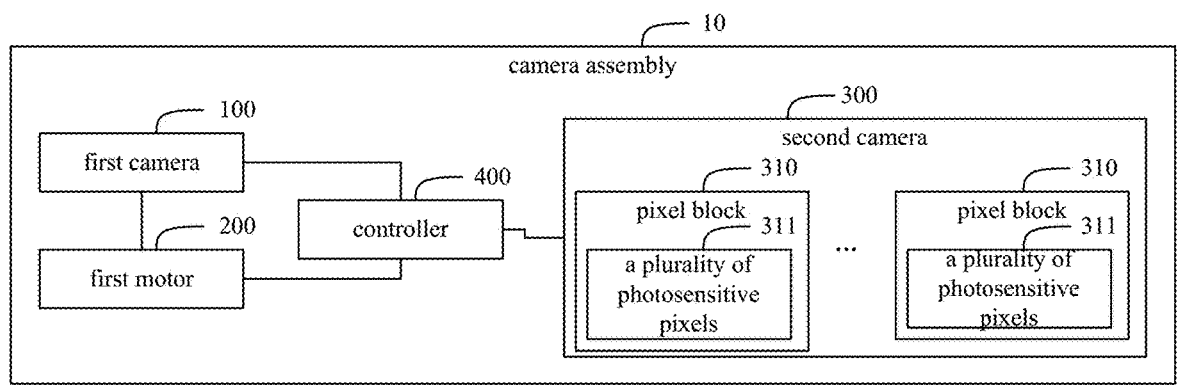
FIG. 1 is a block diagram of a camera assembly according to an embodiment of the present disclosure.

FIG. 1 is a block diagram of a camera assembly according to an embodiment of the present disclosure. It should be noted that, the camera assembly according to embodiments of the present disclosure can be disposed on an electronic device having a photographing function. The electronic device can be a mobile terminal, for example, the mobile terminal can be a hardware device having various operating systems, such as a mobile phone, a tablet PC, a handheld computer, and a PDA.

As illustrated in FIG. 1, the camera assembly 1 may include a first camera 100, a first motor 200, a second camera 300 and a controller 400. The first camera 100 is coupled to the first motor 200. The controller 400 is coupled to the first camera 100, the first motor 200 and the second camera 300 respectively. The first motor 200 can be configured to drive the first camera 100 to move.

Further, as illustrated in FIG. 1, the second camera 300 can include a plurality of pixel blocks 310, and each pixel block 310 can include a plurality of photosensitive pixels 311. Each pixel block 310 is configured to obtain a first photodiode pixel by capturing a target portion of an object to be photographed through a first part of the plurality of photosensitive pixels 311 and obtain a second photodiode pixel by capturing the target portion through a second part of the plurality of photosensitive pixels 311 when the target portion is detected by the second camera 300.

In embodiments of the present disclosure, the target portion of an object to be photographed may be a region of interest (ROI), such as a face of a person, a head of an animal, or a wing of a bird.

As an example, when a face of a person is the target portion, the second camera 300 can determine whether a face exists in the captured image according to a face model. If a face exists, it means that the face is detected. It can be understood that, detecting whether the face exists according to the face model is merely an illustrative implementation, and should not be constituted as a limitation to the present disclosure. That is, the face detection can be realized in other ways, for example, based on the face detection algorithm.

When the second camera 300 detects the face, each pixel block 310 in the second camera 300 can capture the portrait area corresponding to the face through a first part of the plurality of photosensitive pixels 311 to obtain the first photodiode pixel, and can capture the portrait area through a second part of the plurality of photosensitive pixels 311 to obtain the second photodiode pixel.

It should be noted that, the second camera 300 in the present disclosure is configured to be formed of a plurality of pixel blocks 310, and each pixel block 310 is formed of a plurality of photosensitive pixels 311. The plurality of photosensitive pixels 311 can be divided into two parts, i.e., the first part of the plurality of photosensitive pixels and the second part of the plurality of photosensitive pixels. In other words, the second camera 300 is functioned as all-photodiode pixel, that is, the first part of photosensitive pixels is configured to capture the target portion for obtaining the first photodiode pixel, and the second part of photosensitive pixels is configured to capture the target portion for obtaining the second photodiode pixel, thus forming a global photodiode pixel according to the first photodiode pixel and the second photodiode pixel.

The controller 400 can be configured to obtain the global photodiode pixel captured by the second camera 300, to calculate a phase difference according to the global photodiode pixel, and to control the first motor 200 to drive the first camera 100 to move to an in-focus position according to the phase difference.

In detail, the controller 400 can obtain the first photodiode pixel and the second photodiode pixel captured by each pixel block 310 in the second camera 300, and then obtain the global photodiode pixel captured by the second camera 300 according to the first photodiode pixel and the second photodiode pixel captured by each pixel block 310. For example, the controller 400 can perform data adding on the first photodiode pixels captured by all the pixel blocks 310, and perform data adding on the second photodiode pixels captured by all the pixel blocks 310, so as to obtain the photodiode pixel data of the target portion, which is the global photodiode pixel captured by the second camera 300.

After obtaining the global photodiode pixel captured by the second camera 300, the controller 400 can calculate the phase difference according to the global photodiode pixel, and transmit the phase difference to the first camera 100, such that the first motor 200 is controlled to drive the first camera 100 to move to the in-focus position, thus enabling the first camera 100 to move to the in-focus position according to the phase difference calculated by the second camera 300. Since the photodiode pixel in the present disclosure is formed of a plurality of photosensitive pixels, the photodiode pixel density of the second camera is very high, and the sensitivity is also very high, such that the calculated phase difference is very precise, thus realizing the purpose of making the image of the target portion clear in one step.

In order to make those skilled in the art understand the present disclosure clearer, some examples are given below to illustrate the second camera 300 in the present disclosure.

As an example, a number of the plurality of photosensitive pixels 311 in each pixel block may be 2*2. That is, each pixel block 310 of the second camera 300 may include 2*2 photosensitive pixels 311, i.e., one pixel block 310 may be formed of 2*2 photosensitive pixels 311, and multiple such pixel blocks 310 form the second camera 300.

Figure 2:
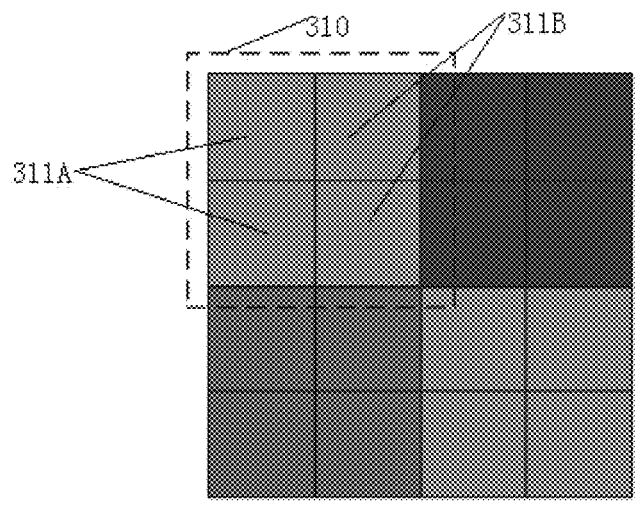
FIG. 2 is a block diagram of a second camera according to an embodiment of the present disclosure.

As an example, each pixel block 310 may be monochrome. For example, assuming that the second camera 300 may be 8-megapixel, as illustrated in FIG. 2, the 8-megapixel second camera is formed of four 2-megapixel pixel blocks, and each pixel block 310 may be formed of 2*2 photosensitive pixels 311, each of the 2*2 photosensitive pixels 311 may be monochrome, and each 2*2 photosensitive pixels 311 form one monochrome pixel block. As illustrated in FIG. 2, the left two photosensitive pixels 311A of the 2*2 photosensitive pixels 311 may be the first part of photosensitive pixels, and the right two photosensitive pixels 311B of the 2*2 photosensitive pixels 311 may be the second part of photosensitive pixels. Moreover, as illustrated in FIG. 2, from the left to the right and the top to the bottom, these four pixels blocks 310 are green, red, blue and green respectively.

Thus, by configuring each pixel block of the second camera to be monochrome pixel formed of a plurality of photosensitive pixels, the second camera is used for all-phase detection, the area of the photodiode pixel (i.e., the photosensitive area) is large, and the sensitivity is high, such that a clear image can be obtained even under low light conditions.

Figure 3:
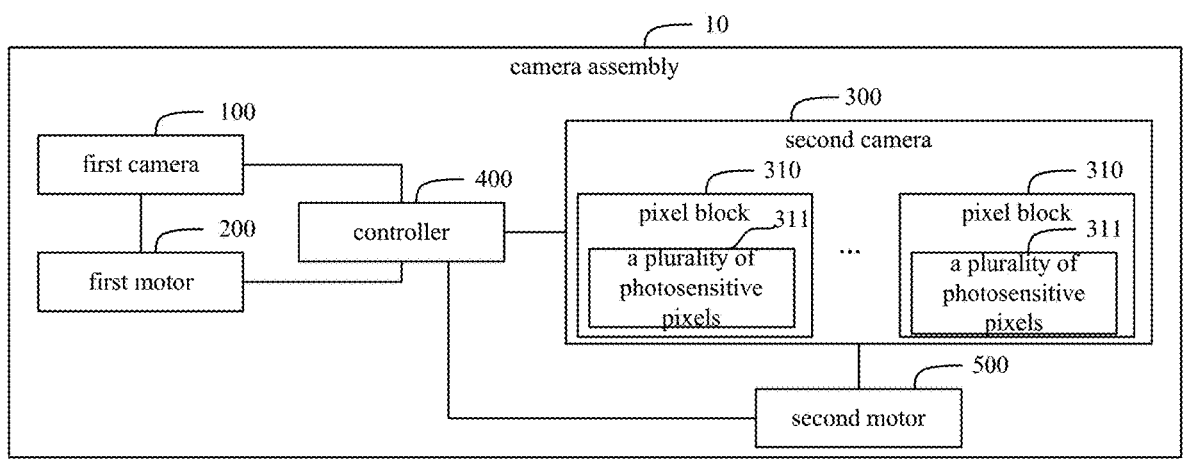
FIG. 3 is a block diagram of a camera assembly according to another embodiment of the present disclosure.

Further, in order to always keep the image clear and realize the purpose of target portion tracking, in an embodiment of the present disclosure as illustrated in FIG. 3, the camera assembly 100 may further include a second motor 500. The second motor 500 is coupled to the second camera 300 and the controller 400 respectively, and the second motor 500 can be configured to drive the second camera 300 to move. In an embodiment of the present disclosure, the controller 400 can be further configured to control the second motor 500 to drive the second camera 300 to move to the in-focus position according to the phase difference.

In other words, when the controller 400 controls the first motor 200 to drive the first camera 100 to move to the in-focus position according to the phase difference, the controller 400 can also control the second motor 500 to drive the second camera 300 to move to the in-focus position according to the phase difference.

As an example, the first motor 100 and the second motor 500 may have the same performances, such that the first camera and the second camera can keep synchronous, and arrive at the in-focus position synchronously. That is, the second camera 300 and the first camera 100 keep the same motor performance. In this way, when the controller controls the first camera and the second camera to move according to the phase difference calculated by the second camera, it can keep the first camera and the second camera moving synchronously, such that the two cameras arrive at the in-focus position synchronously.

With the camera assembly according to embodiments of the present disclosure, the first camera and the second camera are arranged, and the second camera is formed of a plurality of pixel blocks, in which each pixel block is formed of a plurality of photosensitive pixels, and each pixel block is configured to obtain a first photodiode pixel by capturing a target portion through a first part of the plurality of photosensitive pixels and to obtain a second photodiode pixel by capturing the target portion through a second part of the plurality of photosensitive pixels when the target portion is detected by the second camera, and the controller obtains the global photodiode pixel captured by the second camera, calculates the phase difference according to the global photodiode pixel, and controls the first motor to drive the first camera to move to the in-focus position according to the phase difference. That is, by dividing the plurality of photosensitive pixels into two parts for capturing the photodiode pixels, the second camera can be used for all-phase detection, thus increasing the focus accuracy. Moreover, a plurality of photosensitive pixels define one pixel block, such that the area of the photodiode pixel is increased, and the sensitivity is increased accordingly, thus enhancing the accuracy of target portion tracking, realizing the function of quick focusing, improving the user experience.

Figure 4:
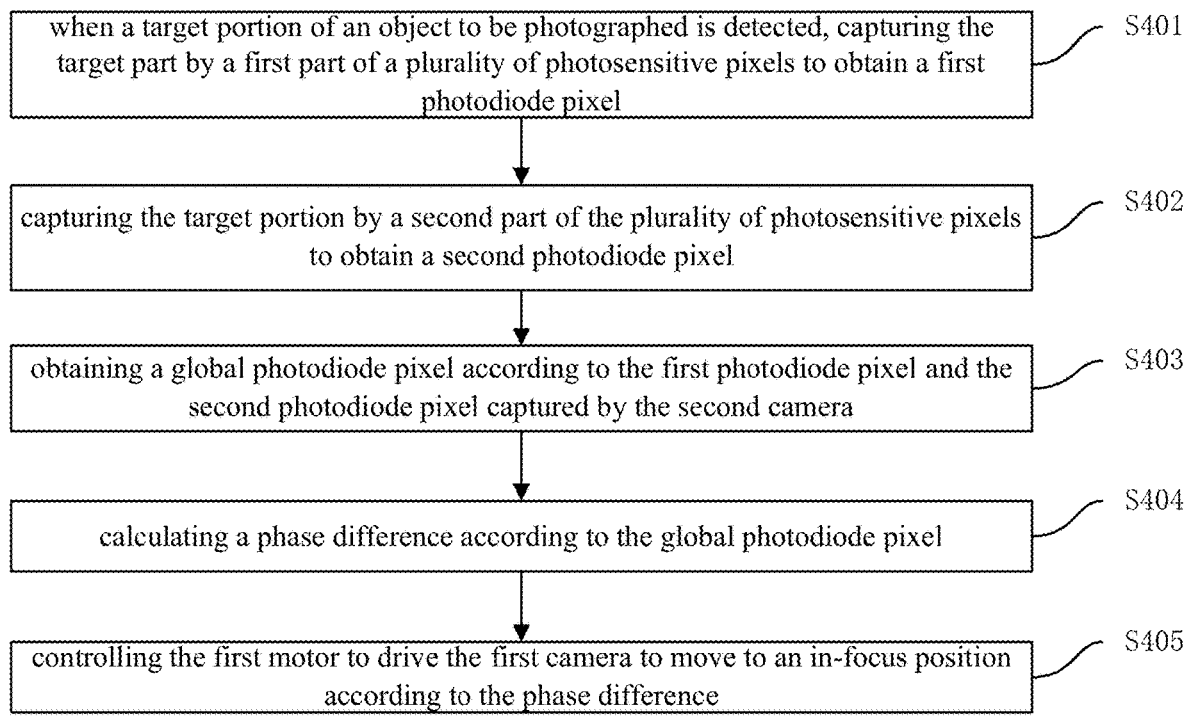
FIG. 4 is a flow chart of a method for tracking a target portion according to an embodiment of the present disclosure.

It should be noted that, the camera assembly of the present disclosure can be applied in the electronic device having the photographing function, and the electronic device can realize the photographing function using the camera assembly. When the photographing is performed using the camera assembly, the target portion tracking may be performed first, such that a clear image of the target portion can be obtained. Therefore, the present disclosure also provides a method for tracking a target portion. FIG. 4 is a flow chart of a method for tracking a target portion according to an embodiment of the present disclosure. It should be noted that, the method for tracking a target portion according to embodiments of the present disclosure is realized based on the camera assembly described above. As illustrated in FIG. 4, the method for tracking a target portion based on the camera assembly according to embodiments of the present disclosure may include following acts.

At block 401, when a target portion of an object to be photographed is detected, the target portion is captured by a first part of a plurality of photosensitive pixels to obtain a first photodiode pixel, in which the plurality of photosensitive pixels form one pixel block, and a plurality of pixel blocks form the second camera.

It should be noted that, in an embodiment of the present disclosure, each pixel block formed of the plurality of photosensitive pixels may be a monochrome pixel, and the plurality of photosensitive pixels may be divided into a first part of photosensitive pixels and a second part of photosensitive pixels. Thus, when the second camera captures images, the first part of photosensitive pixels is used to capture the first photodiode pixel, and the second part of photosensitive pixels is used to capture the second photodiode pixel, such that the second camera is used for all-phase detection.

In embodiments of the present disclosure, the target portion of an object to be photographed may be a face of a person, a head of an animal, or a wing of a bird.

As an example, the second camera can determine whether a face exists in the captured image according to a face model. If a face exists, the face is detected. It can be understood that, detecting whether the face exists according to the face model is merely an illustrative implementation, and should not be constituted as a limitation to the present disclosure. That is, the face detection can be realized in other ways, for example, based on the face detection algorithm.

When the target portion is detected, each pixel block in the second camera can capture the target portion corresponding to the face through a first part of the plurality of photosensitive pixels to obtain the first photodiode pixel.

At block 402, the target portion is captured by a second part of the plurality of photosensitive pixels to obtain a second photodiode pixel.

It can be understood that, block 401 and block 402 may be executed simultaneously. That is, the second part of photosensitive pixels captures the target portion to obtain the second photodiode pixel while the first part of photosensitive pixels captures the target portion to obtain the first photodiode pixel.

At block 403, a global photodiode pixel captured by the second camera is obtained.

In detail, in an embodiment of the present disclosure, the first photodiode pixel and the second photodiode pixel captured by each pixel block can be obtained, and the global photodiode pixel captured by the second camera is obtained according to the first photodiode pixel and the second photodiode pixel captured by each pixel block.

For example, data adding can be performed on the first photodiode pixels captured by all the pixel blocks in the second camera, and data adding can also be performed on the second photodiode pixels captured by all the pixel blocks, such that the photodiode pixel data of the target portion, which is the global photodiode pixel captured by the second camera, is obtained.

At block 404, a phase difference is calculated according to the global photodiode pixel.

At block 405, the first motor is controlled to drive the first camera to move to the in-focus position according to the phase difference.

Further, in order to always keep the image of the target portion clear and realize the purpose of target portion tracking, in an embodiment of the present disclosure, the method for tracking a target portion may further include controlling a second motor to drive the second camera to move to the in-focus position according to the phase difference.

That is, when the first motor is controlled to drive the first camera to move to the in-focus position according to the phase difference, the second motor can also be controlled to drive the second camera to move to the in-focus position according to the phase difference.

As an example, the first motor and the second motor may have the same performances, such that the first camera and the second camera can keep synchronous, and arrive at the in-focus position synchronously. In other words, the second camera and the first camera keep the same motor performance, such that when the controller controls the first camera and the second camera to move according to the phase difference calculated by the second camera, it can keep the first camera and the second camera moving synchronously, such that the two cameras arrive at the in-focus position synchronously.

With the method for tracking a target portion according to embodiments of the present disclosure, the second camera of the camera assembly is configured to be formed of a plurality of pixel blocks, in which each pixel block is formed of a plurality of photosensitive pixels, and each pixel block is configured to obtain a first photodiode pixel by capturing a target portion through a first part of the plurality of photosensitive pixels and to obtain a second photodiode pixel by capturing the target portion through a second part of the plurality of photosensitive pixels when the target portion is detected by the second camera, and then the global photodiode pixel captured by the second camera is obtained, the phase difference is calculated according to the global photodiode pixel, and the first motor is controlled to drive the first camera to move to the in-focus position according to the phase difference. That is, by dividing the plurality of photosensitive pixels into two parts for capturing the photodiode pixels, the second camera can be used for all-phase detection, thus increasing the focus accuracy. Moreover, a plurality of photosensitive pixels define one pixel block, such that the area of the photodiode pixel is increased, and the sensitivity is increased accordingly, thus enhancing the accuracy of target portion tracking, realizing the function of quick focusing, improving the user experience.

In order to achieve above embodiments, the present disclosure also provides an electronic device.

Figure 5:
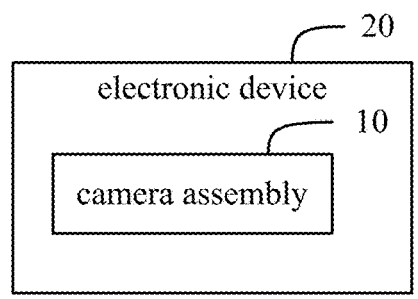
FIG. 5 is a block diagram of an electronic device according to an embodiment of the present disclosure.

FIG. 5 is a block diagram of an electronic device according to an embodiment of the present disclosure. As illustrated in FIG. 5, the electronic device 20 can include the camera assembly 10 according to any one of embodiments of the present disclosure.

With the electronic device according to embodiments of the present disclosure, the second camera of the camera assembly is configured to be formed of a plurality of pixel blocks, in which each pixel block is formed of a plurality of photosensitive pixels, and each pixel block is configured to obtain a first photodiode pixel by capturing a target portion through a first part of the plurality of photosensitive pixels and to obtain a second photodiode pixel by capturing the target portion through a second part of the plurality of photosensitive pixels when the target portion is detected by the second camera, and then the controller obtains the global photodiode pixel captured by the second camera, calculates the phase difference according to the global photodiode pixel, and controls the first motor to drive the first camera to move to the in-focus position according to the phase difference. That is, by dividing the plurality of photosensitive pixels into two parts for capturing the photodiode pixels, the second camera can be used for all-phase detection, thus increasing the focus accuracy. Moreover, a plurality of photosensitive pixels define one pixel block, such that the area of the photodiode pixel is increased, and the sensitivity is increased accordingly, thus enhancing the accuracy of target portion tracking, realizing the function of quick focusing, improving the user experience.

It is to be understood that phraseology and terminology used herein with reference to device or element orientation (such as, terms like "center", "longitudinal", "lateral", "length", "width", "height", "up", "down", "front", "rear", "left", "right", "vertical", "horizontal", "top", "bottom", "inside", "outside", "clockwise", "anticlockwise", "axial", "radial", "circumferential") are only used to simplify description of the present invention, and do not indicate or imply that the device or element referred to must have or operated in a particular orientation. They cannot be seen as limits to the present disclosure.

Moreover, terms of "first" and "second" are only used for description and cannot be seen as indicating or implying relative importance or indicating or implying the number of the indicated technical features. Thus, the features defined with "first" and "second" may comprise or imply at least one of these features. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements or interactions of two elements, which can be understood by those skilled in the art according to specific situations.

In the present disclosure, unless specified or limited otherwise, a structure in which a first feature is "on" a second feature may include an embodiment in which the first feature directly contacts the second feature, and may also include an embodiment in which the first feature indirectly contacts the second feature via an intermediate medium. Moreover, a structure in which a first feature is "on", "over" or "above" a second feature may indicate that the first feature is right above the second feature or obliquely above the second feature, or just indicate that a horizontal level of the first feature is higher than the second feature. A structure in which a first feature is "below", or "under" a second feature may indicate that the first feature is right under the second feature or obliquely under the second feature, or just indicate that a horizontal level of the first feature is lower than the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In this specification, exemplary descriptions of aforesaid terms are not necessarily referring to the same embodiment or example. Furthermore, the particular features, structures, materials, or characteristics may be combined in any suitable manner in one or more embodiments or examples. Moreover, those skilled in the art could combine different embodiments or different characteristics in embodiments or examples described in the present disclosure.

In addition, terms such as "first" and "second" are used herein for purposes of description and are not intended to indicate or imply relative importance or significance or to imply the number of indicated technical features. Thus, the features defined with "first" and "second" may comprise or imply at least one of these features. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc. Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles and scope of the present disclosure.

What is claimed is:

1. A camera assembly, comprising:
   a first camera;
   a first motor, coupled to the first camera, and configured to drive the first camera to move;
   a second camera, comprising a plurality of pixel blocks, each pixel block comprising a plurality of photosensitive pixels, each pixel block being configured to obtain a first photodiode pixel by capturing a target portion of an object to be photographed through a first part of the plurality of photosensitive pixels and obtain a second photodiode pixel by capturing the target portion through a different second part of the plurality of photosensitive pixels when the target portion is detected by the second camera, wherein each pixel block is monochrome, and all photosensitive pixels of the second camera are used for a phase detection by dividing the plurality of photosensitive pixels into the first part and the second part for capturing the first and second photodiode pixels respectively; and
   a controller, coupled to the first camera, the first motor and the second camera respectively, and configured to execute computer readable instructions that, via execution by the controller, cause the controller to:
   obtain a global photodiode pixel by performing data adding on the first photodiode pixels captured by all the pixel blocks and performing data adding on the second photodiode pixels captured by all the pixel blocks in the second camera,
   calculate a phase difference according to the global photodiode pixel, and
   control the first motor to drive the first camera to move to an in-focus position according to the phase difference.

2. The camera assembly according to claim 1, wherein each pixel block is formed of 2*2 photosensitive pixels.

3. The camera assembly according to claim 1, further comprising:
   a second motor, coupled to the second camera and the controller respectively, and configured to drive the second camera to move.

4. The camera assembly according to claim 1, wherein the computer readable instructions, via execution by the controller, further cause the controller to control the second motor to drive the second camera to move to the in-focus position according to the phase difference.

5. The camera assembly according to claim 3, wherein the first motor and the second motor have same performances.

6. The camera assembly according to claim 4, wherein the first motor and the second motor have same performances.

7. The camera assembly according to claim 1, wherein the computer readable instructions, via execution by the controller, further cause the controller to obtain the first photodiode pixel and the second photodiode pixel captured by each pixel block in the second camera and to obtain the global photodiode pixel according to the first photodiode pixels and the second photodiode pixels captured by the plurality of pixel blocks.

8. A method for tracking a target portion by a camera assembly,
the camera assembly comprising a first camera; a first motor coupled to the first camera and configured to drive the first camera to move; a second camera comprising a plurality of pixel blocks, each pixel block being formed of a plurality of photosensitive pixels; and a controller coupled to the first camera, the first motor and the second camera respectively, wherein each pixel block is monochrome;
the method comprising:
when a target portion of an object to be photographed is detected, capturing the target portion by a first part of the plurality of photosensitive pixels to obtain a first photodiode pixel;
capturing the target portion by a different second part of the plurality of photosensitive pixels to obtain a second photodiode pixel, wherein all photosensitive pixels of the second camera are used for a phase detection by dividing the plurality of photosensitive pixels into the first part and the second part for capturing the first and second photodiode pixels respectively;
obtaining a global photodiode pixel by performing data adding on the first photodiode pixels captured by all the pixel blocks and performing data adding on the second photodiode pixels captured by all the pixel blocks;
calculating a phase difference according to the global photodiode pixel; and
controlling the first motor to drive the first camera to move to an in-focus position according to the phase difference.

9. The method according to claim 8, wherein the camera assembly further comprises a second motor, coupled to the second camera and the controller respectively, and configured to drive the second camera to move; and
the method further comprises:
controlling the second motor to drive the second camera to move to the in-focus position according to the phase difference.

10. The method according to claim 8, wherein obtaining a global photodiode pixel captured by the second camera comprises:
obtaining the first photodiode pixel and the second photodiode pixel captured by each pixel block; and
obtaining the global photodiode pixel captured by the second camera according to the first photodiode pixel and the second photodiode pixel captured by each pixel block.

11. The method according to claim 9, wherein the first motor and the second motor have same performances.

12. An electronic device comprising:
a first camera;
a first motor, coupled to the first camera, and configured to drive the first camera to move;
a second camera, comprising a plurality of pixel blocks, each pixel block comprising a plurality of first photosensitive pixels and a plurality of different second photosensitive pixels, the plurality of first photosensitive pixels being configured to obtain a first photodiode pixel by capturing a target portion of an object to be photographed, the plurality of second photosensitive pixels being configured to obtain a second photodiode pixel by capturing the target portion when the target portion is detected by the second camera, wherein each pixel block is monochrome, and all photosensitive pixels of the second camera are used for a phase detection by dividing the plurality of photosensitive pixels into the first part and the second part for capturing the first and second photodiode pixels respectively; and
a controller, coupled to the first camera, the first motor and the second camera, and configured to execute computer readable instructions that, via execution by the controller, cause the controller to:
obtain a global photodiode pixel by performing data adding on the first photodiode pixels captured by all the pixel blocks and performing data adding on the second photodiode pixels captured by all the pixel blocks,
calculate a phase difference according to the global photodiode pixel, and
control the first motor to drive the first camera to move to an in-focus position according to the phase difference.

13. The electronic device according to claim 12, wherein each pixel block is formed of 2*2 photosensitive pixels.

14. The electronic device according to claim 12, further comprising:
a second motor, coupled to the second camera and the controller respectively, and configured to drive the second camera to move.

15. The electronic device according to claim 14, wherein the computer readable instructions, via execution by the controller, further cause the controller to control the second motor to drive the second camera to move to the in-focus position according to the phase difference.

16. The electronic device according to claim 14, wherein the first motor and the second motor have same performances.

* * * * *